(12) United States Patent
Shen

(10) Patent No.: US 11,320,863 B2
(45) Date of Patent: May 3, 2022

(54) FLEXIBLE DISPLAY PANEL AND ELECTRONIC DEVICE

(71) Applicant: WUHAN CHINA STAR OPTOELECTRONICS SEMICONDUCTOR DISPLAY TECHNOLOGY CO., LTD., Hubei (CN)

(72) Inventor: Haiyang Shen, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 134 days.

(21) Appl. No.: 16/813,198

(22) Filed: Mar. 9, 2020

(65) Prior Publication Data

US 2021/0200270 A1 Jul. 1, 2021

(30) Foreign Application Priority Data

Dec. 25, 2019 (CN) .......................... 201911360382.8

(51) Int. Cl.
  *G06F 1/16* (2006.01)
  *H04M 1/02* (2006.01)
(52) U.S. Cl.
  CPC ........ *G06F 1/1652* (2013.01); *H04M 1/0268* (2013.01)
(58) Field of Classification Search
  CPC .... G06F 1/1613; G06F 1/1616; G06F 1/1652; G09F 9/301
  See application file for complete search history.

(56) References Cited

U.S. PATENT DOCUMENTS 9,349,777 B2 * 5/2016 An .................... H01L 51/0097
9,552,018 B2 * 1/2017 Sato .................... G06F 1/1626
(Continued)

FOREIGN PATENT DOCUMENTS

CN 104900156 A 9/2015
CN 109661131 A 4/2019
(Continued)

OTHER PUBLICATIONS

Li Ji-Jun, Nie Xiao-Meng, Li Gen-Sheng, Wang An-Xiang, Zhang Wei-Guang, Lang Feng-Chao, Yang Lian-Xiang. Comparison and research progress of flat panel display technology[J], Chinese Optics, 2018, 11(5):695-710.

*Primary Examiner* — Anthony Q Edwards

(57) ABSTRACT

The present invention provides a flexible display panel and an electronic device. The panel includes: a main body having a bending region and a non-bending region, the main body including an accommodating cavity arranged corresponding to the bending region; and a support member placed in the accommodating cavity. The support member includes a first support sheet and a second support sheet. The second support sheet keeps the bending region flat when the flexible display panel is in a flat state. The first support sheet keeps a bending radius of the bending region within a preset range when the flexible display panel is in a bent state. The flexible display panel and the electronic device of the present invention avoids breakage of a circuit in the flexible display panel and prolongs a product's service life.

16 Claims, 1 Drawing Sheet

(56) References Cited

U.S. PATENT DOCUMENTS

| | | | |
|---|---|---|---|
| 9,791,892 B2* | 10/2017 | Park | G06F 1/1616 |
| 10,212,811 B1* | 2/2019 | Zhang | H01L 27/3244 |
| 10,401,907 B2 | 9/2019 | Song | |
| 2006/0146488 A1* | 7/2006 | Kimmel | G06F 1/1616 |
| | | | 361/679.04 |
| 2016/0007441 A1 | 1/2016 | Matsueda | |
| 2017/0062742 A1* | 3/2017 | Kim | H01L 51/5253 |
| 2020/0004295 A1* | 1/2020 | Paek | G06F 1/1641 |
| 2021/0150944 A1* | 5/2021 | Yoon | G06F 1/1652 |

FOREIGN PATENT DOCUMENTS

| | | |
|---|---|---|
| CN | 110570769 A | 12/2019 |
| CN | 110580860 A | 12/2019 |
| CN | 110599913 A | 12/2019 |
| KR | 20190081335 A | 7/2019 |

\* cited by examiner

FLEXIBLE DISPLAY PANEL AND ELECTRONIC DEVICE

FIELD OF DISCLOSURE

The present invention relates to a field of display technology and in particular, to a flexible display panel and an electronic device.

DESCRIPTION OF RELATED ART

With continuous development of display technology, display panels are used more and more extensively, and users' requirements for functions and appearance of display panels are more and more diverse. In order to meet the above requirements, flexible display panels are provided. Flexible display panels are extensively used in electronic products such as mobile phones and smart bracelets.

However, a bending radius of a flexible display directly affects a service life of the flexible display panel. Generally, if the bending radius is within a preset range (that is, the bending radius is large), it is difficult to ensure the flatness of the unfolded panel, so that a circuit is prone to break, and a product's service life is shortened.

Therefore, it is necessary to provide a flexible display panel and an electronic device to solve the problems of the conventional techniques.

SUMMARY

It is an objective of the present invention to provide a flexible display panel and an electronic device, which can avoid breakage of a circuit in the flexible display panel and prolong a service life.

Accordingly, the present invention provides a flexible display panel, comprising:

a main body comprising a bending region and a non-bending region, the main body defining an accommodating cavity disposed corresponding to the bending region; and a support member disposed in the accommodating cavity, the support member comprising a first support sheet and a second support sheet, wherein the first support sheet keeps a bending radius of the bending region within a preset range when the flexible display panel is in a bent state, and the second support sheet keeps the bending region flat when the flexible display panel is in a flat state.

The present invention further provides an electronic device. The electronic device comprises the above-mentioned flexible display panel.

The present invention provides a flexible display panel and an electronic device. The flexible display panel comprises:

a main body comprising a bending region and a non-bending region, the main body defining an accommodating cavity disposed corresponding to the bending region; and a support member disposed in the accommodating cavity, the support member comprising a first support sheet and a second support sheet, wherein the first support sheet keeps a bending radius of the bending region within a preset range when the flexible display panel is in a bent state, and the second support sheet keeps the bending region flat when the flexible display panel is in a flat state; Such configuration avoids breakage of a circuit in the flexible display panel and prolongs a product's service life.

BRIEF DESCRIPTION OF DRAWINGS

In order to more clearly illustrate the embodiments of the present disclosure or related art, figures which will be described in the embodiments are briefly introduced hereinafter. It is obvious that the figures are merely for the purposes of illustrating some embodiments of the present disclosure, and a person having ordinary skill in this field can obtain other figures according to these figures without an inventive work.

DETAILED DESCRIPTION OF EMBODIMENTS

Figure 1:
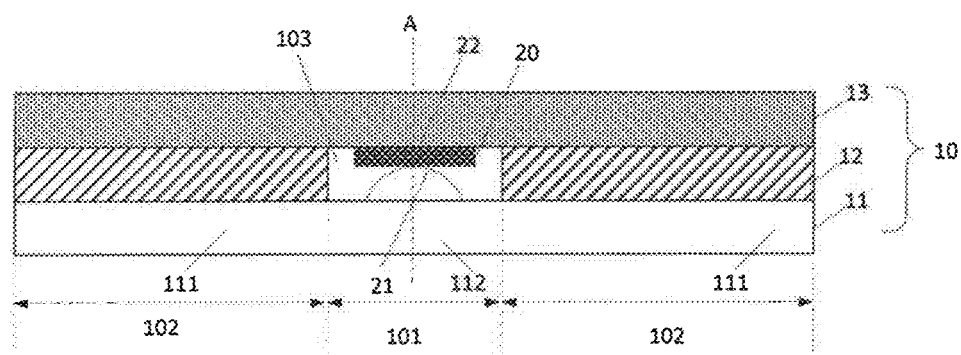
FIG. 1 is a schematic structural view illustrating a flexible display panel in a flat state.

The following descriptions are provided to illustrate specific embodiments with reference to the accompanying drawings. Directional terms mentioned in the present invention, such as "up", "down", "front", "rear", "left", "right", "inside", "outside", and "lateral", are for explaining and understanding the present invention, but not for limiting the present invention. In the drawings, similar structural units are denoted by the same reference numerals.

The terms such as "first", "second", and the like in the description and claims of the present application and the accompanying drawings are used to distinguish different objects, and are not used to describe a specific order. Furthermore, the terms, such as "comprising", "including", and any variations thereof, are intended to cover a non-exclusive inclusion.

Figure 2:
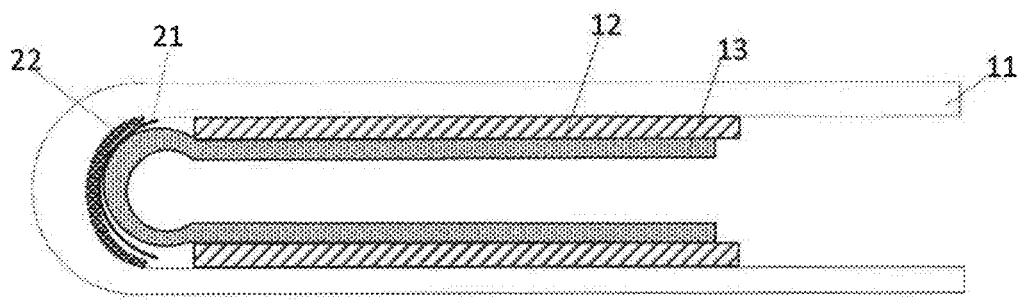
FIG. 2 is a schematic structural view illustrating the flexible display panel in a bent state.

Please refer to FIGS. 1 and 2. FIG. 1 is a schematic structural view illustrating a flexible display panel in a flat state.

As shown in FIG. 1, the flexible display panel of the present invention includes a main body 10 and a support member 20. The main body 10 comprises a bending region 101 and a non-bending region 102. In the present embodiment, there can be two non-bending regions 102. The bending region 101 is arranged between two non-bending regions 102. Certainly, the present invention is not intended to limit the number of the bending regions and the number of the non-bending regions. The main body 10 defines an accommodating cavity 103 disposed corresponding to the bending region 101.

In one embodiment, a cross-sectional structure of the main body 10 comprises: a flexible base 11, a driving layer 12, and a display layer 13. The flexible base 11 comprises a first sub-portion 111 and a second sub-portion 112; The first sub-portion 111 is disposed corresponding to the bending region 101, and the second sub-portion 112 is disposed corresponding to the non-bending region 102. The driving layer 12 is disposed on the second sub-portion 112. In other words, the driving layer 12 is not disposed on the first sub-portion 111. The display layer 13 is disposed on the driving layer 12 and the support member 20.

The support member 20 is disposed in the accommodating cavity 103, the support member 20 comprises a first support sheet 21 and a second support sheet 22. The second support sheet 22 keeps the bending region flat when the flexible display panel is in the flat state. The first support sheet 21 keeps a bending radius of the bending region 101 within a preset range when the flexible display panel is in a bent state.

The first support sheet 21 and the second support sheet 22 have a same symmetry axis A. An extension line of the symmetry axis A, a geometric center of the first support sheet 21, and a geometric center of the second support sheet 22 are all located on a same straight line.

According to one embodiment, the geometric center of the first support sheet 21 and the geometric center of the second support sheet 22 are fixed together. For example, in one embodiment, the geometric center of the first support sheet 21 and the geometric center of the second support sheet 22 are fixed by a string pulling them together, thereby facilitating simultaneous deformation of the two support sheets.

According to one embodiment of the present invention, the support member 20 is disposed in a middle region of the accommodating cavity. In other words, the support member 20 is disposed in a middle region of the bending region 101. A geometric center of the first support sheet 21, a geometric center of the second support sheet 22, and a center of the bending region 101 are all located on a same straight line, so that the bending area 101 reaches the maximum bending radius, and a surface is flatter when in the flat state.

As shown in FIGS. 1 and 2, when the flexible display panel is in a flat state, an arc of the first support sheet 21 curves toward a first direction. When the flexible display panel is in the bent state, the arc of the first support sheet 21 curves toward a second direction. The first direction is different from the second direction. When the flexible display panel is in the flat state, the arc of the first support sheet 21 curves downwards. When the flexible display panel is in the bent state, the arc of the first support sheet 21 curves rightwards. A bending direction of the first support sheet 21 is the same as a bending direction of the bending region 101. When the flexible display panel is in the bent state and in the flat state, a shape of the first support sheet 21 does not change.

According to one embodiment, the first support sheet 21 is disposed under the second support sheet 22, the second support sheet 22 is in contact with a top portion of the accommodating cavity 103, and the first support sheet 21 is in contact with a bottom portion of the accommodating cavity 103.

The second support sheet 22 has a strip shape, and the first support sheet 21 can have an arc shape. Certainly, the shapes of the first support sheet 21 and the second support sheet 22 are not limited to the above mentioned.

According to one embodiment of the present invention, when the flexible display panel is in the flat state, the second support sheet 22 has a first shape, and when the flexible display panel is in the bent state, the second support sheet 22 has a second shape. The first shape is, for example, a strip shape, and the second shape is, for example, an arc shape.

In one embodiment, in order to ensure the flatness of the flexible display panel, the first support sheet 21 and the second support sheet 22 are made of polyethylene terephthalate (PET) or a photosensitive adhesive.

The support member is disposed in the bending region, the second support sheet is used to keep the bending region flat when the flexible display panel is in the flat state, the first support sheet is used to keep the bending radius of the bending region within the preset range when the flexible display panel is in the bent state. As a result, the bending radius of the flexible display panel can meet the predetermined requirements when the flexible display panel is in the bent state; and when the flexible display panel is in the flat state, the bending region is kept flat to avoid breakage of a circuit in the flexible display panel and prolong a product's service life.

The present invention provides a flexible display panel and an electronic device. The flexible display panel comprises:

a main body comprising a bending region and a non-bending region, the main body defining an accommodating cavity disposed corresponding to the bending region; and a support member disposed in the accommodating cavity, the support member comprising a first support sheet and a second support sheet, wherein the second support sheet keeps the bending region flat when the flexible display panel is in a flat state; and the first support sheet keeps a bending radius of the bending region within a preset range when the flexible display panel is in a bent state. Such configuration avoids breakage of a circuit in the flexible display panel and prolongs a product's service life.

In summary, although the present invention has been disclosed above with preferable embodiments, the above embodiments are not intended to limit the present invention. Those skilled in the art can make various modifications without departing from the spirit and scope of the present invention. The protection scope of the present invention should be defined by the appended claims.

What is claimed is:

1. A flexible display panel, comprising:
   a main body comprising a bending region and a non-bending region, the main body defining an accommodating cavity disposed corresponding to the bending region; and
   a support member disposed in the accommodating cavity, the support member comprising a first support sheet and a second support sheet, wherein the first support sheet keeps a bending radius of the bending region within a preset range when the flexible display panel is in a bent state, and the second support sheet keeps the bending region flat when the flexible display panel is in a flat state, wherein the second support sheet is disposed on the first support sheet, the second support sheet is in contact with a top portion of the accommodating cavity, and the first support sheet is in contact with a bottom portion of the accommodating cavity.

2. The flexible display panel according to claim 1, wherein the first support sheet and the second support sheet have a same symmetry axis, and an extension line of the symmetry axis, a geometric center of the first support sheet, and a geometric center of the second support sheet are all located on a same straight line.

3. The flexible display panel according to claim 1, wherein a geometric center of the first support sheet and a geometric center of the second support sheet are fixed together.

4. The flexible display panel according to claim 3, wherein the support member is disposed in a middle region of the accommodating cavity.

5. The flexible display panel according to claim 1, wherein the first support sheet has an arc shape, and the second support sheet has a strip shape.

6. The flexible display panel according to claim 1, wherein when the flexible display panel is in the flat state, the second support sheet has a first chaps is flat-shaped, and when the flexible display panel is in the bent state, the second support sheet is bent-shaped.

7. The flexible display panel according to claim 1, wherein the first support sheet and the second support sheet are made of polyethylene terephthalate (PET) or a photosensitive adhesive.

8. The flexible display panel according to claim 1, wherein a cross-sectional structure of the main body comprises:
   a flexible base comprising a first sub-portion and a second sub-portion, wherein the first sub-portion is disposed corresponding to the bending region, the second sub-portion is disposed corresponding to the non-bending region;

a driving layer disposed on the second sub-portion; and a display layer disposed on the driving layer and the support member.

9. An electronic device comprising a flexible display panel, the flexible display panel comprising:

a main body comprising a bending region and a non-bending region, the main body defining an accommodating cavity disposed corresponding to the bending region; and a support member disposed in the accommodating cavity, the support member comprising a first support sheet and a second support sheet, wherein the first support sheet keeps a bending radius of the bending region within a preset range when the flexible display panel is in a bent state, and the second support sheet keeps the bending region flat when the flexible display panel is in a flat state, wherein the second support sheet is disposed on the first support sheet, the second support sheet is in contact with a top portion of the accommodating cavity, and the first support sheet is in contact with a bottom portion of the accommodating cavity.

10. The electronic device according to claim 9, wherein the first support sheet and the second support sheet have a same symmetry axis, and an extension line of the symmetry axis, a geometric center of the first support sheet, and a geometric center of the second support sheet are all located on a same straight line.

11. The electronic device according to claim 9, wherein a geometric center of the first support sheet and a geometric center of the second support sheet are fixed together.

12. The electronic device according to claim 11, wherein the support member is disposed in a middle region of the accommodating cavity.

13. The electronic device according to claim 9, wherein the first support sheet has an arc shape, and the second support sheet has a strip shape.

14. The electronic device according to claim 9, wherein when the flexible display panel is in the flat state, the second support sheet is flat-shaped, and when the flexible display panel is in the bent state, the second support sheet is bent-shaped.

15. The electronic device according to claim 9, wherein the first support sheet and the second support sheet are made of polyethylene terephthalate (PET) or a photosensitive adhesive.

16. The electronic device according to claim 9, wherein a cross-sectional structure of the main body comprises:

a flexible base comprising a first sub-portion and a second sub-portion, wherein the first sub-portion is disposed corresponding to the bending region, the second sub-portion is disposed corresponding to the non-bending region;

a driving layer disposed on the second sub-portion; and a display layer disposed on the driving layer and the support member.

* * * * *